United States Patent
Ng

(10) Patent No.: US 7,469,306 B2
(45) Date of Patent: Dec. 23, 2008

(54) METHOD FOR COMMUNICATING WITH FIRST AND SECOND DEVICE THAT INCLUDES REFERENCE TO METADATA WHEREIN THIRD DEVICE MODIFIES THE METADATA BASED ON SPECIFIC OPERATIONS BY FIRST DEVICE

(75) Inventor: Sheau-Bao Ng, Briarcliff Manor, NY (US)

(73) Assignee: NXP B.V., Eindhoven (NL)

( * ) Notice: Subject to any disclaimer, the term of this patent is extended or adjusted under 35 U.S.C. 154(b) by 1709 days.

(21) Appl. No.: 10/184,516

(22) Filed: Jun. 28, 2002

(65) Prior Publication Data

US 2004/0003415 A1    Jan. 1, 2004

(51) Int. Cl.
*G06F 13/00*     (2006.01)
*H04N 7/16*     (2006.01)

(52) U.S. Cl. .................. 710/74; 710/8; 710/9; 710/10; 710/72; 710/73; 707/1; 707/3; 707/100; 707/101; 725/151; 725/139

(58) Field of Classification Search ............... 710/8–10, 710/74–76; 707/1, 3, 100, 103; 725/151, 725/139
See application file for complete search history.

(56) References Cited

U.S. PATENT DOCUMENTS

| | | | |
|---|---|---|---|
| 4,870,515 A | 9/1989 | Stokes | 360/72.2 |
| 6,996,556 B2 * | 2/2006 | Boger et al. | 707/3 |
| 7,003,214 B2 * | 2/2006 | Ando et al. | 386/96 |
| 2003/0085913 A1 * | 5/2003 | Ahmad et al. | 345/730 |
| 2005/0108769 A1 * | 5/2005 | Arnold et al. | 725/115 |

FOREIGN PATENT DOCUMENTS

| EP | 0841664 A2 | 5/1998 |
|---|---|---|
| JP | 269952 A | 9/2002 |

OTHER PUBLICATIONS

TV Gets Personal Personal Video Recorders; Oliphant et al.; Sep. 2001; IEEE Rev. (UK), IEE Review, IEE, UK, IRN, ISSN; 1 page.
Content Description for Efficient Video Navigation, Browsing and Personalization; van Beek et al.; Jun. 2000; Proceedings IEEE Workshop on Content-Based Access of Image and Video Libraries, Proceedings IEEE Workshop on Content-based Access of Image and Video Libraries, Hilton Head Island, SC, USA; 1 page.
Integrated Multimedia Processing for Topic Segmentation and Classification; Jasinschi et al.; Oct. 2001; Proceedings 2001 International Conference on Image Processing (Cat. No. 01CH37205), Proceedings 2001 International Conference on Image Processing, Thessaloniki, Greece; 1 page.

* cited by examiner

*Primary Examiner*—Tammara R Peyton

(57) ABSTRACT

A method and structure manage a database. A first device that includes data is coupled to a second device that includes metadata relating to the data. The second device is removed from the first device and the metadata is modified. The second device is again coupled to the first device and the modified metadata on the second device modifies the data on the first device.

37 Claims, 4 Drawing Sheets

METHOD FOR COMMUNICATING WITH FIRST AND SECOND DEVICE THAT INCLUDES REFERENCE TO METADATA WHEREIN THIRD DEVICE MODIFIES THE METADATA BASED ON SPECIFIC OPERATIONS BY FIRST DEVICE

BACKGROUND OF THE INVENTION

1. Technical Field

The present invention relates to a structure and associated method to manage a database.

2. Related Art

A database typically includes data and metadata for the data on the same device. Managing the database requires a user to perform management functions directly on the device that includes the data and the metadata. These devices are typically awkward in the support of performing complicated management functions. Thus there is a need for a simplified structure and method to manage a database.

SUMMARY OF THE INVENTION

The present invention provides an electrical structure, comprising:

a first device comprising data, wherein the first device is coupled to a second device, wherein the second device comprises metadata relating to the data in the first device, and wherein the second device is adapted to be removed from the first device.

The present invention provides an electrical structure, comprising:

a second device, wherein the second device is coupled to a first device, wherein the first device comprises data, wherein the second device comprises metadata relating to the data in the first device, wherein the first device does not comprise the metadata, and wherein the second device is adapted to be removed from the first device.

The present invention provides a method to manage a database, comprising:

providing a first device coupled to a second device, wherein the first device includes data and metadata relating to the data, wherein the second device includes the metadata, and wherein the second device is adapted to be coupled to a third device;

removing the second device from the first device and coupling the second device to a third device that is not coupled to the first device;

using the third device to modify the metadata on the second device;

removing the second device from the third device and coupling the second device to the first device; and updating the metadata on the first device with the modified metadata in the second device.

The present invention provides a method to manage a database, comprising:

providing a first device having data, wherein the first device is coupled to a second device, wherein the second device comprises metadata relating to the data in the first device, wherein the first device does not comprise the metadata, and wherein the second device is adapted to be coupled to a third device;

removing the second device from the first device and coupling the second device to a third device that is not coupled to the first device;

using the third device to modify the metadata on the second device;

removing the second device from the third device and coupling the second device to the first device.

The present invention provides a method to manage a database, comprising:

providing a first device coupled to a second device, wherein the first device includes data and metadata relating to the data, wherein the second device includes the metadata, and wherein the second device comprises a memory device, a CPU, an instruction set, an input device, and an output device;

removing the second device from the first device;

modifying the metadata on the second device;

coupling the second device to the first device;

updating the metadata on the first device with the modified metadata on the second device.

The present invention provides a method to manage a database, comprising:

providing a first device coupled to a second device, wherein the first device includes data and metadata relating to the data, wherein the second device includes the metadata, and wherein the second device comprises a memory device, a CPU, an instruction set, an input device, and an output device;

removing the second device from the first device;

modifying the metadata on the second device;

updating the metadata on the first device with the modified metadata on the second device.

DETAILED DESCRIPTION OF THE INVENTION

Figure 1:
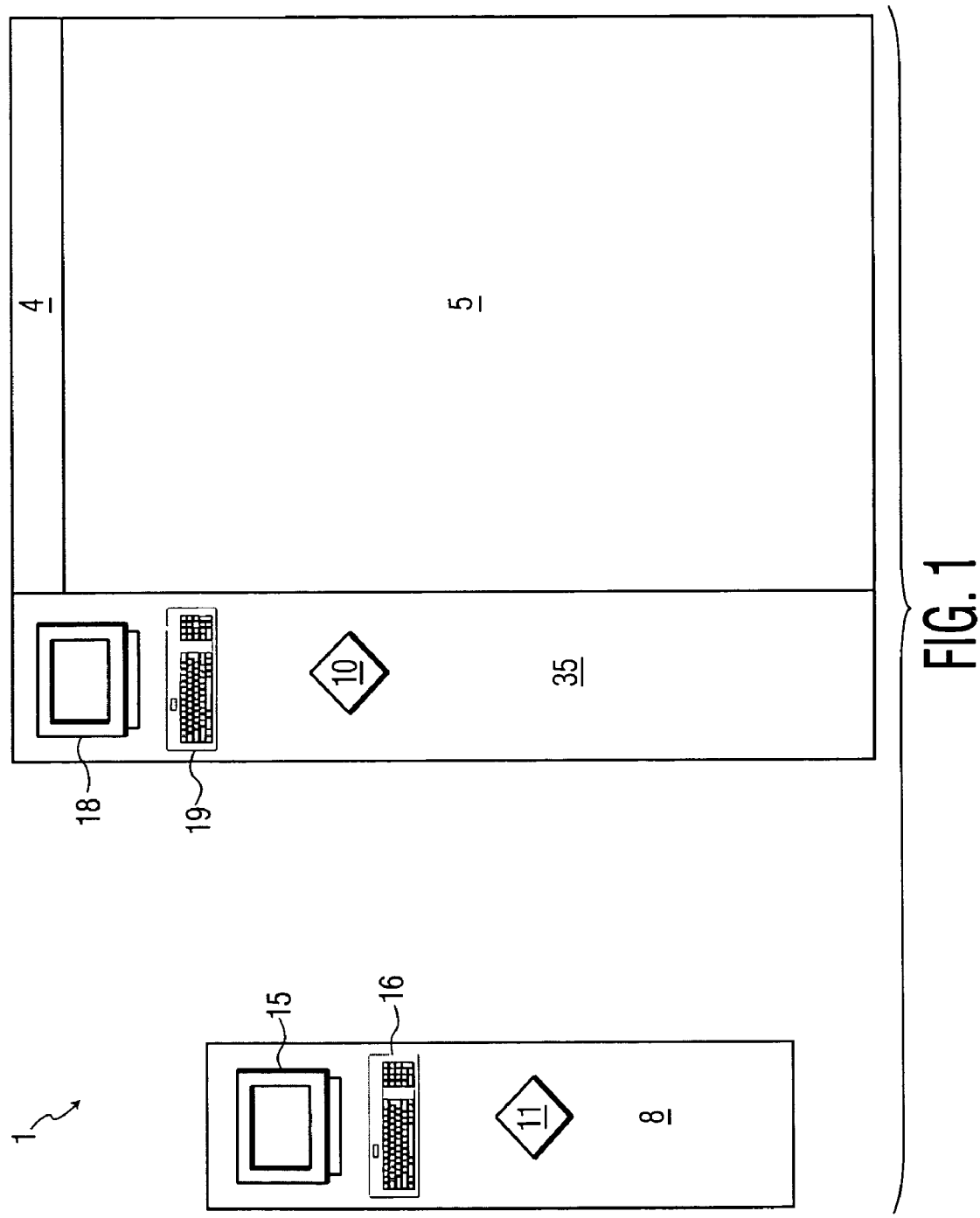
FIG. 1 depicts a block diagram view of an electronic structure showing a removable memory device coupled to a fixed memory device and a remote device without a memory device, in accordance with embodiments of the present invention.
Figure 2:
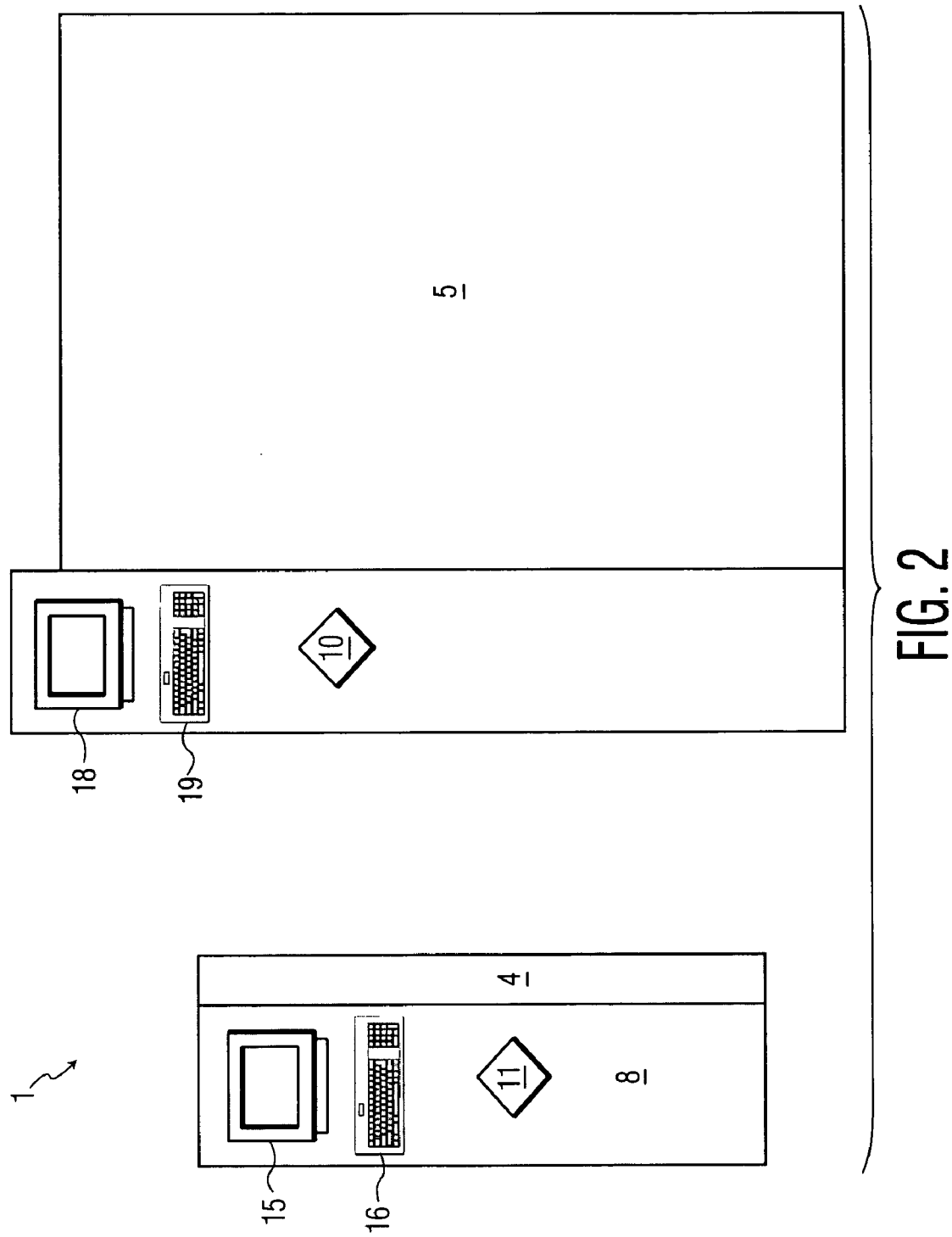
FIG. 2 depicts FIG. 1 showing a block diagram view of the electronic structure with the fixed memory device and the removable memory device coupled to the remote device, in accordance with embodiments of the present invention.

FIG. 1 illustrates a block diagram view of an electronic structure 1 comprising a first device 5 coupled to a second device 4 wherein the second device 4 is adapted to be removed from the first device 5, in accordance with embodiments of the present invention. The first device 5 includes memory. The second device 4 includes memory. The electronic structure 1 may be a Personal Video Recorder (PVR) set-top-box (STB). The electronic structure 1 may have a control device 35 comprising a central processing unit (CPU) 10, an input device 19, an output device 18, and software (i.e., instruction set or executable code). The control device 35 controls data storage and data retrieval on the first device 5. The input device 19 may be any input device known to a person of ordinary skill in the art such as a keypad, keyboard, mouse etc. The output device 18 may be any output device known to a person of ordinary skill in the art such as a monitor, printer, liquid crystal display (LCD) etc. The first device 5 may include a large amount of data (i.e., greater than 10 Gbytes) stored in the memory of the first device 5. The data in the first device 5 may be video data, audio data, text data or a combination thereof. The video data may be digital videos or digital pictures. The first device 5 may also include metadata relating to the data. The metadata may comprise directory structure, table of content, access control, and synopsis of content for the data. A copy of the metadata on the first device 5 may be stored in the memory of the second device 4. Alternatively, the first device 5 may include only the data (and no metadata) and the second device 4 may include the metadata. The second device 4 may include removable memory. The second device 4 may comprise a compact flash card, a memory stick, a secured digital memory card, a multimedia memory card, a computer disc, etc. The second device 4 may be removed from the electronic structure 1 and coupled to a third device 8 (i.e., as shown in FIG. 2) in a separate location (e.g., a remote location) so that the metadata on the second device 4 may be modified through the use of the third device 8. The third device 8 may comprise a CPU 11, an input device 16, an output device 15, and software (i.e., instruction set or executable code). The third device 8 may be a computer, a mobile telephone, or a personal digital assistant (PDA). The second device 4 may have a storage capacity in a range of about 8 megabytes to about 512 megabytes. The third device 8 provides the hardware (e.g., CPU) and software for performing the modification of the metadata on the second device 4. The metadata may be modified so that specific operations may be performed on the data (i.e., such as database reorganization, update data, editing or deleting files). After the metadata is modified in the second device 4, the second device 4 may be removed from the third device 8 and coupled to the first device 5 of the electronic structure 1. The modified metadata may now perform operations on the data stored in the first device 5. Alternatively, the metadata may have been modified to perform operations on the data at a specific time or times in the future.

FIG. 2 illustrates a block diagram view of FIG. 1 after the second device 4 has been removed from the first device 5 of the electronic structure 1, in accordance with embodiments of the present invention. The second device 4 is then coupled to the third device 8 so that the metadata may be modified as previously discussed in conjunction with FIG. 1. After the metadata has been modified, the second device 4 is removed from the third device 8 and coupled to the first device 5 (as shown in FIG. 1) so that operations may be performed on the data in the first device 5.

Figure 3:
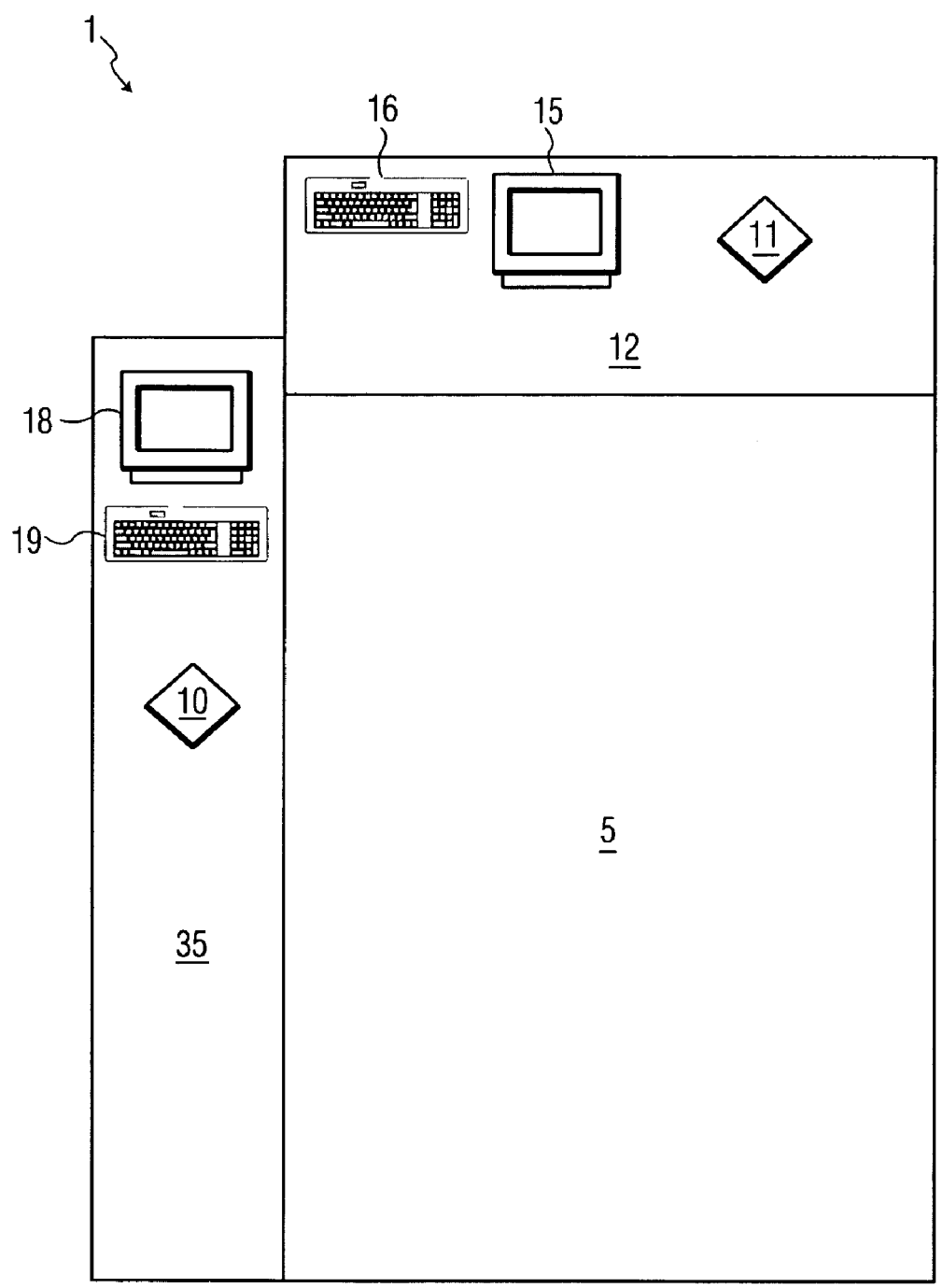
FIG. 3 depicts a block diagram view of an electronic structure showing a removable memory device with a built in central processing unit (CPU) and input/output (I/O) coupled to a fixed memory device, in accordance with embodiments of the present invention.

FIG. 3 illustrates a block diagram view of an electronic structure 1 comprising a first device 5 coupled to a second device 12 wherein the second device 12 is adapted to be removed from the first device 5, in accordance with embodiments of the present invention. The first device 5 includes memory. The second device 12 comprises a central processing unit (CPU) 11, software, (i.e., instruction set or executable code) memory, an input device 16 and an output device 15. The electronic structure 1 may be a Personal Video Recorder (PVR) set-top-box (STB). The electronic structure 1 may have a control device 35 comprising a CPU 10, an input device 19, an output device 18, and software (i.e., instruction set or executable code). The control device 35 controls data storage and data retrieval on the first device 5. The input device 16 and the input device 19 may be any input device known to a person of ordinary skill in the art such as a keypad, keyboard, mouse, etc. The output device 15 and the output device 18 may be any output device known to a person of ordinary skill in the art such as a monitor, liquid crystal display (LCD), printer, etc. The first device 5 may include a large amount of data (i.e., greater than 10 Gbytes) stored in the memory of the first device 5. The data in the first device 5 may be video data, audio data, text data, or any combination thereof. The video data may be digital videos or digital pictures. The first device 5 may include metadata relating to the data. The metadata may comprise directory structure, table of content, access control, and synopsis of content for the data. A copy of the metadata on the first device 5 maybe stored in the memory of the second device 12. Alternatively, the first device 5 may include only the data (and no metadata) and the second device 12 may include the metadata. The second device 12 may include a compact flash card, a memory stick, a secured digital memory card, a multimedia memory card, a computer disc, etc. The second device 12 may be removed from the electronic structure 1 and taken to a separate location (e.g, a remote location) so that the metadata on the second device 12 may be modified. The metadata may be modified so that to specific operations may be performed on the data (i.e., such as database reorganization, update data, editing or deleting files). After the metadata is modified in the second device 12, the second device 12 may be coupled to the first device 5 of the electronic structure 1. The modified metadata may now perform operations on the data stored in the first device 5. Alternatively, the metadata may have been modified to perform operations on the data at a specific time or times in the future. The second device 12 may have a storage capacity in a range of about 8 megabytes to about 512 megabytes.

Figure 4:
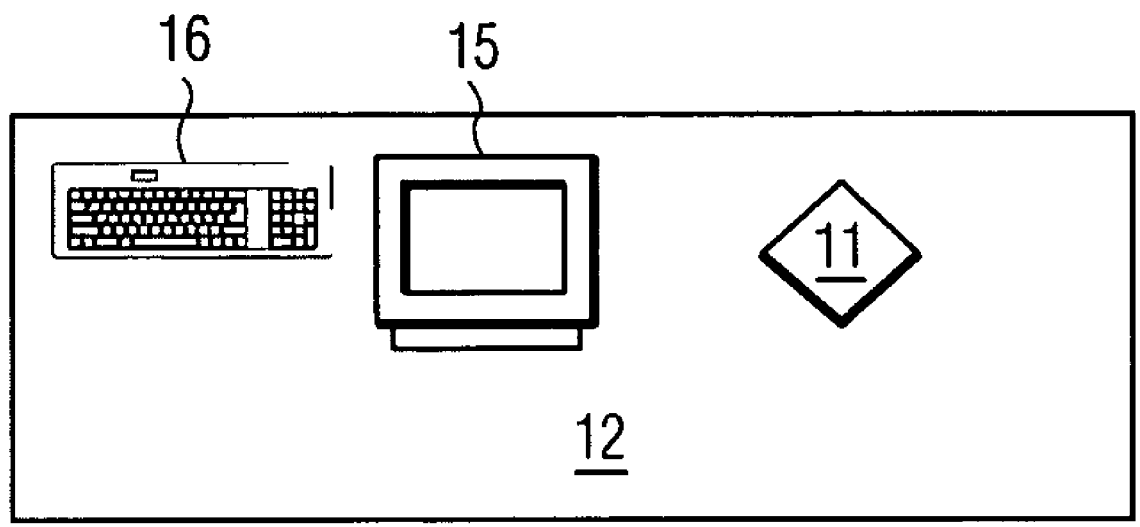
FIG. 4 depicts a block diagram view of the removable memory device with built in CPU and I/O, in accordance with embodiments of the present invention.

FIG. 4 illustrates a block diagram view of FIG. 3 after the second device 12 has been removed from the first device 5 of the electronic structure 1, in accordance with embodiments of the present invention. The second device 12 is removed from the electronic structure 1 that the metadata may be modified as previously discussed in conjunction with FIG. 3. After the metadata has been modified, the second device 12 is coupled to the first device 5 (as shown in FIG. 3) so that operations may be performed on the data in the first device 5. Alternatively, the second device 12 may comprise a wireless link to the first device 5 so that the second device 12 does not have to be coupled to the first device 5 to perform operations to the data on the first device 5.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An electrical structure comprising:
   a first device comprising data;
   a second device adapted for attachment to the first device, wherein the second device comprises metadata relating to the data in the first device, and wherein the second device is adapted for removal from the first device; and
   a third device adapted for attachment to the second device, said third device for modifying the metadata on the second device when the second device is interfaced with the third device for performing specific operations on the data by the first device.

2. The electrical structure of claim 1, wherein the data is selected from the group consisting of audio data and video data.

3. The electrical structure of claim 1, wherein the first device includes metadata, and wherein the metadata on the second device and the metadata on the first device are the same metadata.

4. The electrical structure of claim 1, wherein the second device comprises memory, a central processing unit (CPU), software, an input device, and an output device.

5. The electrical structure of claim 1, wherein the third device is selected from the group consisting of a computer, a personal digital assistant (PDA), a personal organizer, and a mobile telephone.

6. The electrical structure of claim 1, wherein the modified metadata modifies the data for specific operations.

7. The electrical structure of claim 1, wherein the second device is selected from the group consisting of a compact flash card, a memory stick, a secured digital memory card, a multimedia memory card, and a computer disc.

8. The electrical structure of claim 1, wherein the first device comprises a personal video recorder set top box.

9. The electrical structure of claim 1, wherein the metadata is modified on the second device when the second device is detached from the first device.

10. An electrical structure comprising:
a first device, and a second device coupled to the first device, wherein the first device comprises data, wherein the second device comprises metadata relating to the data in the first device, and wherein the second device is removable from the first device; and
a third device having an interface for coupling to the second device, said third device for modifying the metadata on the second device for performing specific operations on the data by the first device.

11. The electrical structure of claim 10, wherein the data is selected from the group consisting of audio data and video data.

12. The electrical structure of claim 10, wherein the first device includes metadata, and wherein the metadata on the second device and the metadata on the first device are the same metadata.

13. The electrical structure of claim 10, wherein the second device comprises memory, a central processing unit (CPU), software, an input device, and an output device.

14. The electrical structure of claim 10, wherein the the third device for modifying the metadata on the second device when the second device is interfaced only with the third device.

15. The electrical structure of claim 14, wherein the third device is selected from the group consisting of a computer, a personal digital assistant (PDA), a personal organizer, and a mobile telephone.

16. The electrical structure of claim 14, wherein the modified metadata is adapted to modify the data in the first device.

17. The electrical structure of claim 10, wherein the second device is selected from the group consisting of a compact flash card, a memory stick, a secured digital memory card, a multimedia memory card, and a computer disc.

18. The electrical structure of claim 10, wherein the first device comprises a personal video recorder set top box.

19. The electrical structure of claim 10, wherein the third device modifying the metadata on the second device and the second device is uncoupled from the first device.

20. A method to manage a database, comprising:
coupling a first device coupled to a second device, wherein the first device includes data and metadata relating to the data, wherein the second device includes the metadata, and wherein the second device is adapted for coupling to a third device that is not coupled to the first device;
modifying by the third device the metadata on the second device when the second device is removed from the first device;
updating the metadata on the first device with the modified metadata in the second device when the second device is coupled again to the first device for performing specific operations on the data by the first device with the updated metadata.

21. The method of claim 20, further comprising performing a specified operation to the data in the first device using the updated metadata in the first device.

22. The method of claim 20, wherein the data is selected from the group consisting of audio data and video data.

23. The method of claim 20, wherein the third device is selected from the group consisting of a computer, a personal digital assistant (PDA), a personal organizer, and a mobile telephone.

24. The method of claim 20, wherein the second device is selected from the group consisting of a compact flash card, a memory stick, a secured digital memory card, a multimedia memory card, and a computer disc.

25. The method of claim 20, wherein the first device comprises a personal video recorder set top box.

26. A method to manage a database, comprising:
providing a first device having data and a second device, wherein the first device is coupled to the second device, wherein the second device comprises metadata relating to the data in the first device, wherein the first device does not include the metadata relating to the data on the first device, and wherein the second device is adapted for coupling to a third device that is not coupled to the first device;
modifying by the third device the metadata on the second device when the third device is coupled to the second device for performing specific operations on the data of the first device based in the modified metadata.

27. The method of claim 26, further comprising performing a specified operation to the data in the first device.

28. The method of claim 26, wherein the data is selected from the group consisting of audio data and video data.

29. The method of claim 26, wherein the third device that is selected from the group consisting of a computer, a personal digital assistant (PDA), a personal organizer, and a mobile telephone.

30. The method of claim 26, wherein the second device is selected from the group consisting of a compact flash card, a memory stick, a secured digital memory card, a multimedia memory card, and a computer disc.

31. The method of claim 26, wherein the first device comprises a personal video recorder set top box.

32. A method to manage a database, comprising:
providing a first device comprising data and wherein the first device includes data and metadata relating to the data, and a second device coupled to the first device wherein the second device includes a copy of the metadata in the first device, and wherein the second device comprises a memory device, a central processing unit (CPU), an instruction set, an input device, and an output device;
modifying the metadata on the second device when the second device is uncoupled from the first device; and
updating the metadata on the first device with the modified metadata on the second device when the second device is re-coupled to the first device.

33. The method of claim 32, further comprising using the updated metadata on the first device to perform a specified operation to the data on the first device.

34. A method to manage a database, comprising:
providing a first device including data and metadata relating to the data, and a second device coupled to the first device which includes a copy of the metadata of the first device, and wherein the second device comprises a memory device, a central processing unit (CPU), an instruction set, an input device, and an output device;

modifying the metadata on the second device when the second device is uncoupled from the first device; and updating the metadata on the first device with the modified metadata on the second device.

35. The method of claim 34, wherein the second device comprises a wireless link to the first device.

36. The method of claim 34, further comprising using the updated metadata on the first device to perform a specified operation to the data on the first device.

37. The method of claim 20, wherein the first device does not include any of the metadata of the second device.

* * * * *